C. HUTTER.
TIME CONTROLLED SHUTTER RELEASING MEANS.
APPLICATION FILED SEPT. 6, 1912.

1,161,683.

Patented Nov. 23, 1915.
5 SHEETS—SHEET 1.

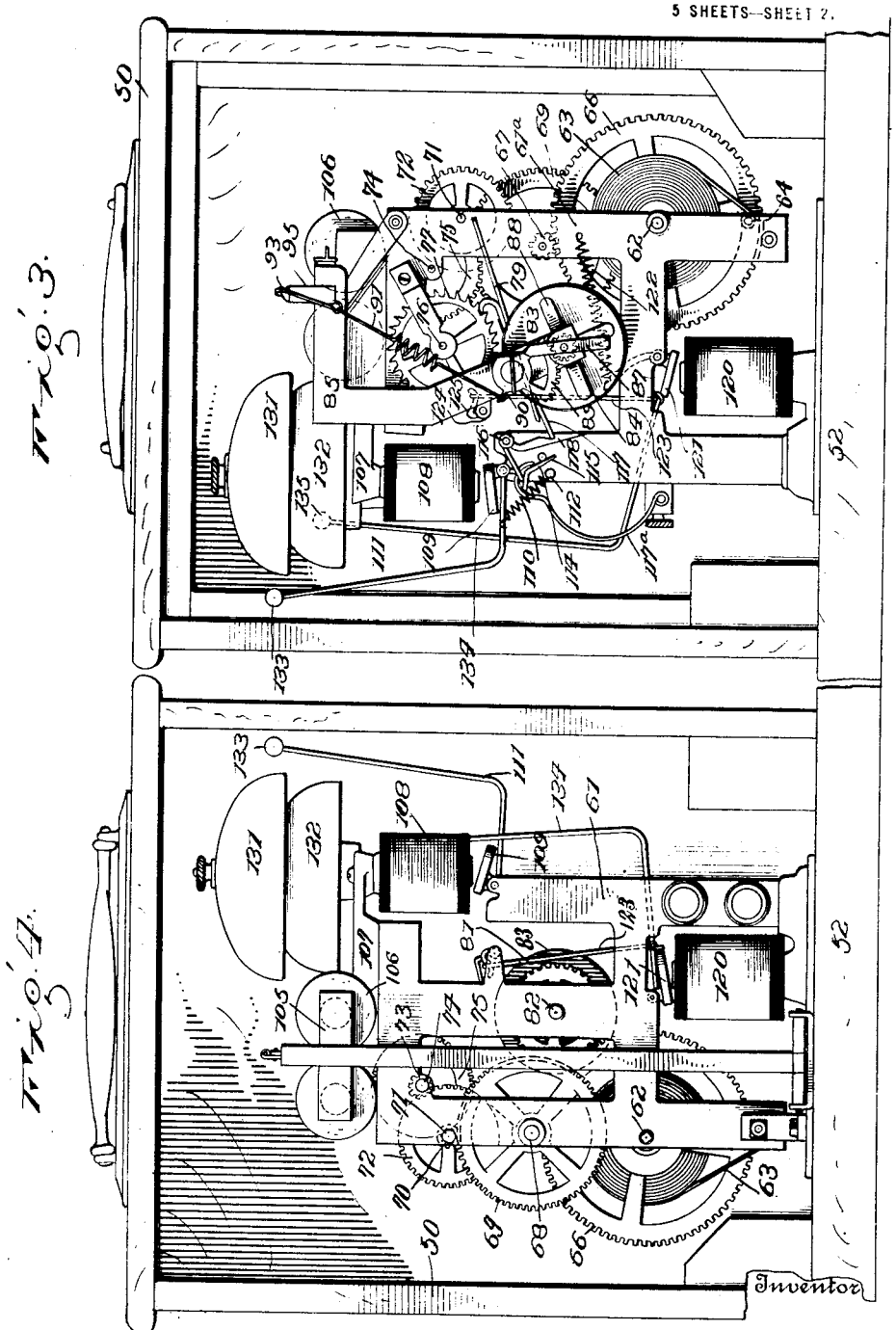

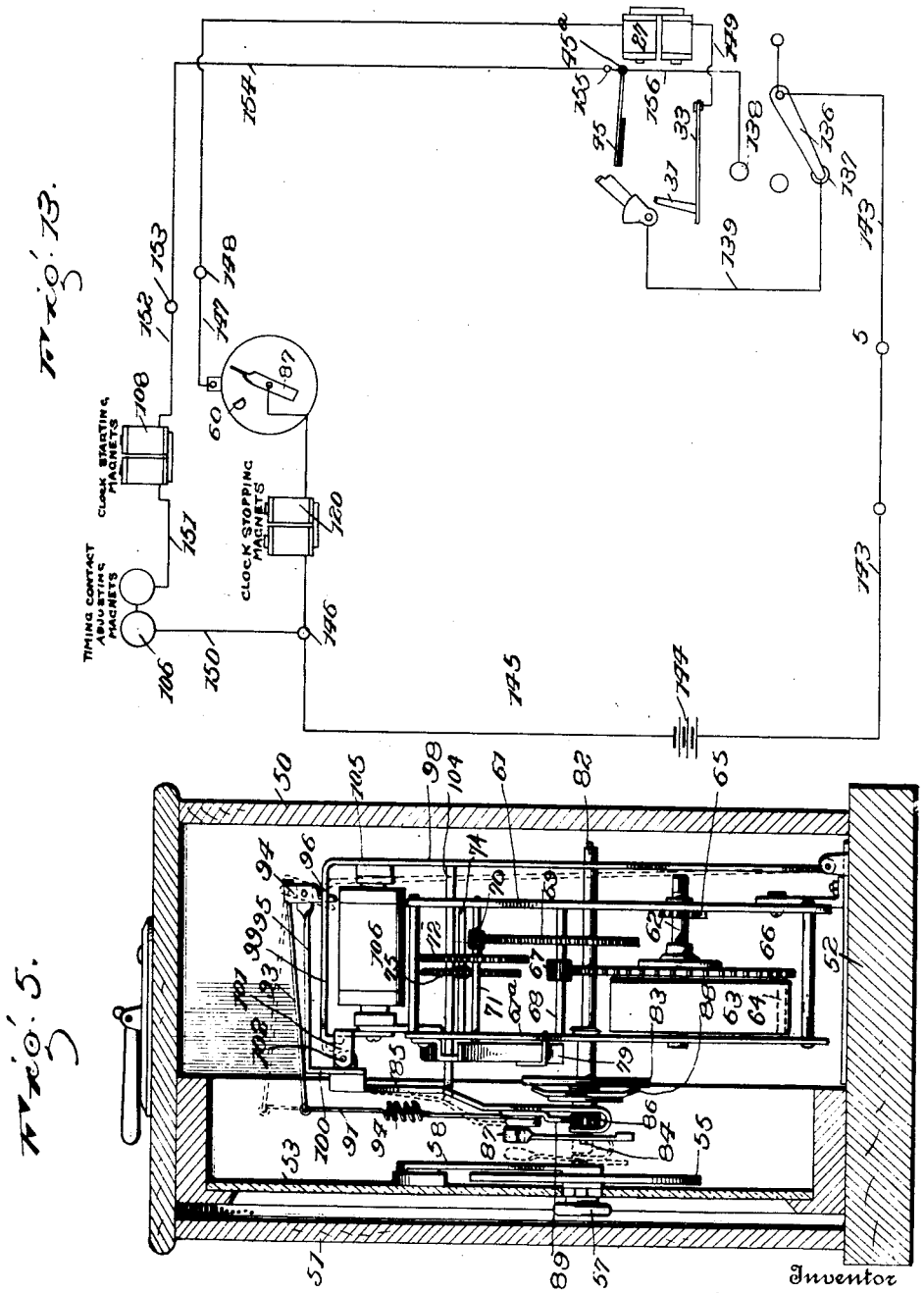

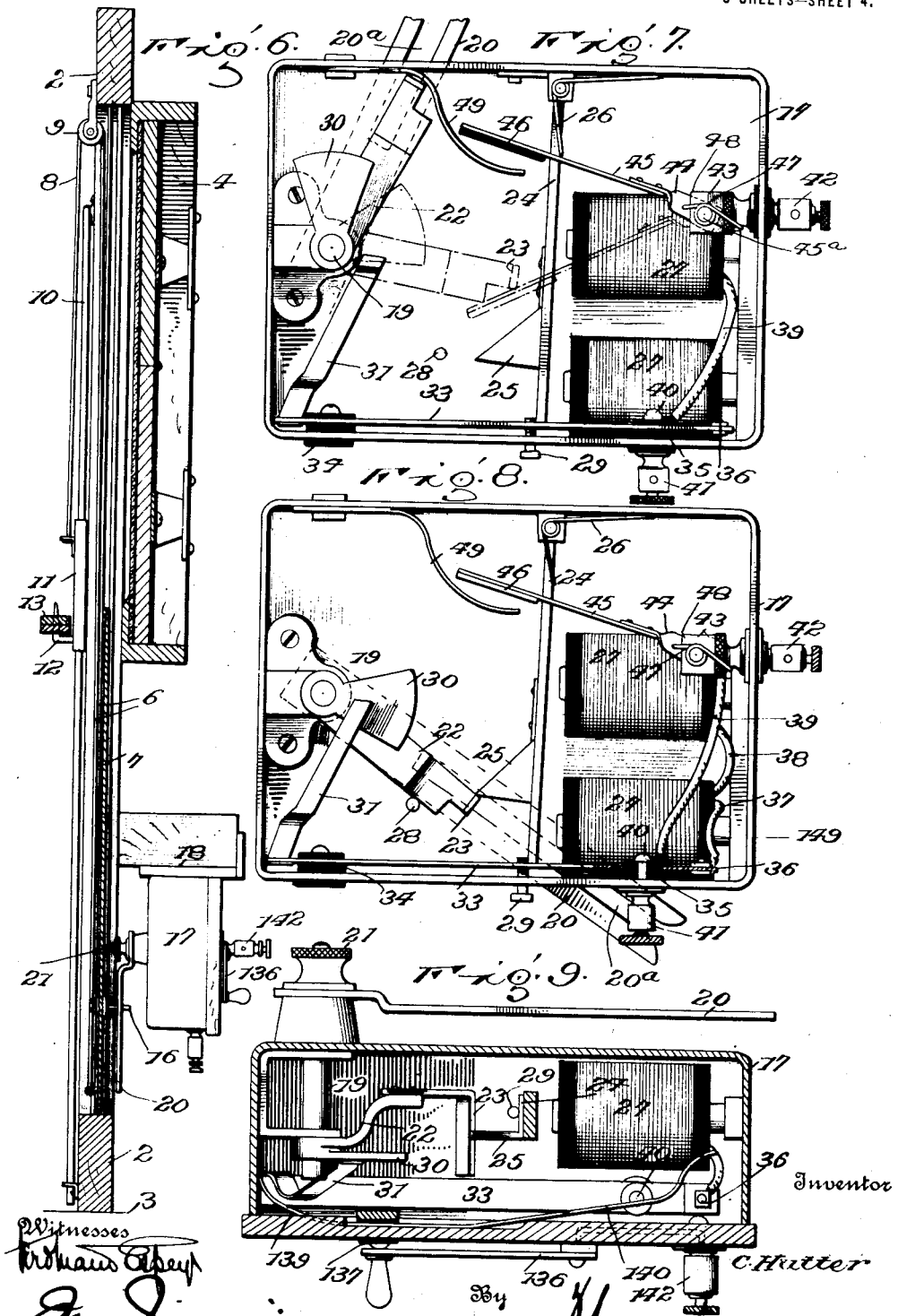

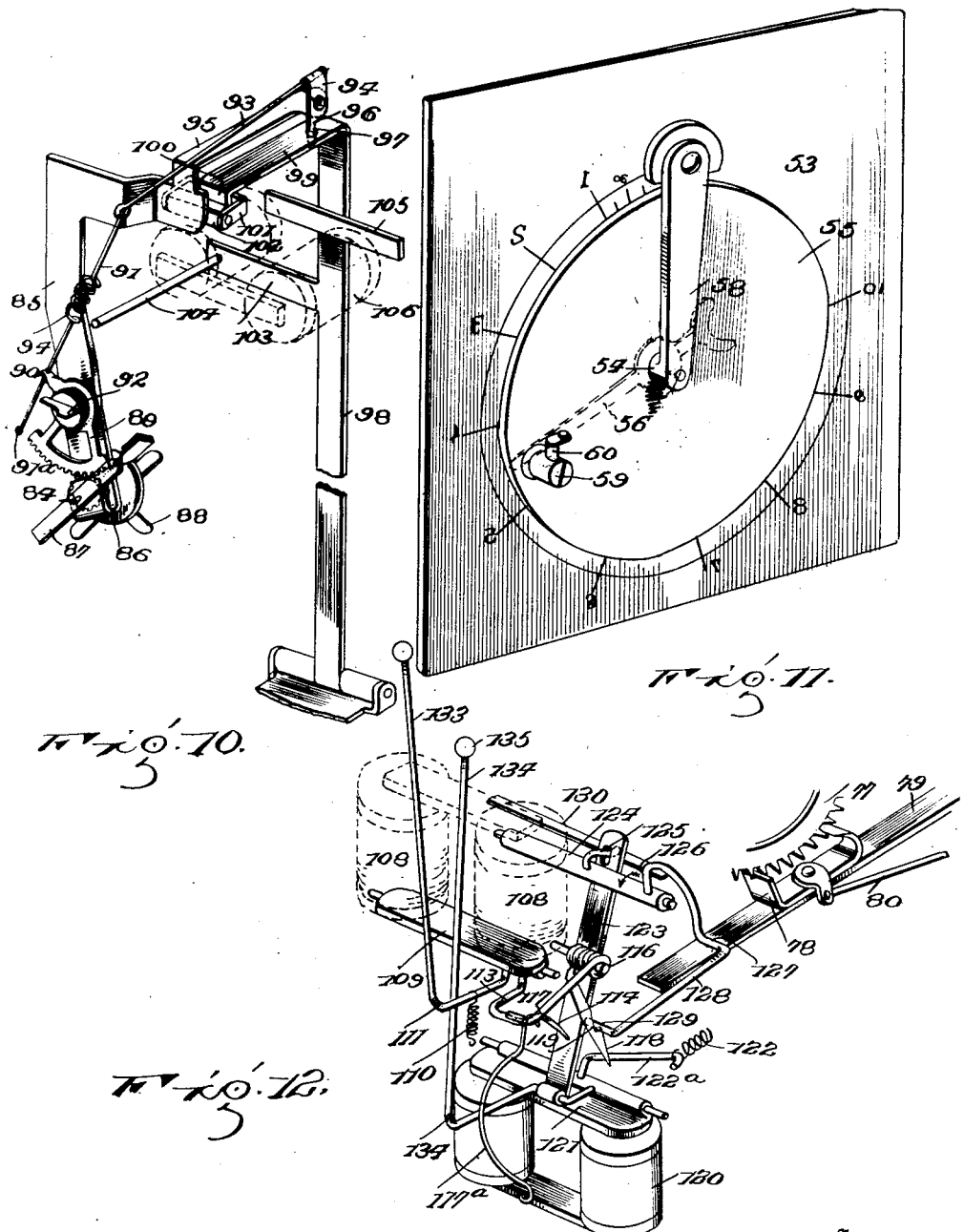

UNITED STATES PATENT OFFICE.

CHARLES HUTTER, OF WORCESTER, MASSACHUSETTS, ASSIGNOR TO GENERAL ELECTRIC COMPANY, A CORPORATION OF NEW YORK.

TIME-CONTROLLED SHUTTER-RELEASING MEANS.

1,161,683.

Specification of Letters Patent.

Patented Nov. 23, 1915.

Application filed September 6, 1912. Serial No. 719,028.

*To all whom it may concern:*

Be it known that I, CHARLES HUTTER, citizen of the United States, residing at Worcester, in the county of Worcester and State of Massachusetts, have invented certain new and useful Improvements in Time-Controlled Shutter - Releasing Means, of which the following is a specification.

My invention relates to devices for printing from photographic negatives, and particularly to mechanism for actuating the shutter for controlling the period of exposure of the negative.

Apparatus has before been provided for releasing a shutter to prevent over printing of a photographic negative, but these shutters have been released by the operator at will and are not automatic in their action. Such apparatus requires that the operator shall watch the clock to note the time of exposure and that he shall personally release the shutter. This is oftentimes very inconvenient and oftentimes leads to an over exposure with disastrous results to the print.

The general object of my invention is the provision of time controlled shutter releasing means adapted to be used in connection with a printing frame, and in this connection another object of the invention consists in the provision of means whereby the period of time during which the shutter shall remain open may be regulated so as to provide for an exposure of any desired length, from an exposure of seconds to one of many minutes, and whereby the shutter shall be dropped automatically at the end of the predetermined period.

A further object is to provide in this connection means for starting the clock work of the time controlling mechanism immediately upon the raising of the shutter, and a further object is to provide means whereby the shutter may be raised by hand to its operative position and start the clock controlled mechanism.

A still further object is to provide means whereby the shutter may be operated by hand when desired.

Other objects will appear in the course of the following description.

My invention is illustrated in the accompanying drawings, wherein,

Figure 1 is an elevation of a printing frame, the shutter frame connected therewith, and the clock controlled mechanism for actuating the shutter. Fig. 2 is a rear elevation of the shutter frame, the shutter being in its lowered position. Figs. 3 and 4 are front and rear elevations respectively of the time controlling clock mechanism. Fig. 5 is a vertical section through the case showing the clock mechanism in end elevation. Fig. 6 is a vertical section through the shutter frame and the printing frame. Fig. 7 is a front elevation of the switch and shutter holding mechanism with the shutter engaging arm raised in position to release the shutter. Fig. 8 is a like view to Fig. 7, but showing the members in a position taken by them when the shutter releasing and holding arm is lowered. Fig. 9 is a transverse section on line 9—9 of Fig. 8. Fig. 10 is a perspective detail view of a portion of the clock actuated mechanism. Fig. 11 is an inside face view of the rotatable contact carrier and the dial within which it is mounted. Fig. 12 is a detail perspective view of the alarm sounding mechanism of the clock. Fig. 13 is a diagrammatic view of the several operating magnets, the switches for energizing the same, and the several circuits of said magnets.

I will describe first the shutter supporting frame to which the printing frame is attached. This part of the mechanism is illustrated in Figs. 1, 2 and 6. The shutter frame is illustrated as rectangular in form and is designated generally 2. The shutter frame is supported in any suitable manner as by base 3. The printing frame is designated 4, and is supported in any suitable way upon the shutter frame, as for instance by the spring clips 5, which permit the printing frame to be readily disconnected from the shutter.

I have not illustrated the printing frame in detail as printing frames ordinarily are well known and my apparatus is adapted to be used with any desired form of printing frame.

Sliding vertically in a guide 6 is a shutter 7, shown as formed of sheet metal, but which may be of any suitable material. Supporting cords 8 are attached to the bottom edge of the shutter and extend upward and over pulleys 9 supported on the top frame bar 2. Guide rods 10 are mounted upon the rear face of the frame and extend vertically in spaced relation thereto, and on these guide rods sleeves 11 slide. These sleeves are each provided with hooks 12 upon which are hung the counter-weighting bars 13. These counter-weighting bars may be of any number necessary to counter-weight the shutter so that when the shutter is released by the mechanism to be hereafter described the counter-weights will act to draw the shutter up to its highest position.

A cord 14 is attached to the lower edge of the shutter and passes under a pulley 15 on the lower bar of the shutter frame, whereby the shutter may be drawn down from its raised position. The shutter is provided on its outer face with a pin 16 whereby the shutter may be engaged with a holding and releasing means as will be now described.

Mounted in any suitable manner adjacent to the base of the shutter frame, is a casing 17 rectangular in form and inclosing the shutter holding and releasing devices, as illustrated in Figs. 7, 8 and 9. Preferably and as illustrated, the casing 17 has a flat top plate which slides in guides 18 carried on the underside of the lower bar of the printing frame. Projecting through the rear wall of the casing 17 is a short rock shaft 19 supported in suitable bearings and carrying on its outer end a shutter engaging arm 20 held in any desired adjusted position on the shaft by a knurled nut 21. Projecting from the shaft 19 is an arm 22 which is disposed parallel to the latch arm 20, the end of the arm being turned at right angles to the body of the arm as at 23. The outer end of the arm is preferably offset from the inner end thereof. Pivotally mounted upon the upper wall of the case, and depending therefrom is an armature 24 carrying upon its face a projecting detent 25 having a beveled upper edge. A spring 26 acts to force the armature outward and away from the poles of the electro-magnets 27, which are arranged in superposed relation within the casing 17. The arm 22 is prevented from dropping too far by means of a stop pin 28, while the armature is prevented from too great an outward movement at its lower end by means of the stop screw 29 (see Figs. 7 and 8). Preferably and as illustrated in Fig. 9, the detent 25 is formed of sheet metal angularly bent and attached to the face of the armature 24, and preferably the spring 26 is wound around the pivot pin of the armature 24 and one end of the spring bears against the top of the casing 17, while the lower end of the spring extends down and engages the armature below its pivot.

It will be seen that when the shutter is lowered and its pin 16 is disposed within the slot 20ª of the arm 20 and said arm 20 is depressed to the position shown in Fig. 8, the terminal end of the arm 22 will engage beneath the detent 25 and the arm will be held from any upward movement, thus holding the shutter from any upward movement. Immediately, however, that the magnets 27 are energized they will act to draw over the armature 24, thus releasing the detent, whereupon the weight of the counterweights 13 will act to draw out the shutter and the arm 20, and arm 22 will rotate to the position shown in Fig. 7.

Mounted upon shaft 19 and extending radially therefrom is a segmental contact plate 30. As illustrated in Figs. 7 and 8, this contact plate is so set with relation to the arm 22 that it is out of alinement with the arm 22, and is rearward of the same as the arm 22 moves downward. Mounted in position to be engaged by this contact plate as it moves downward is a contact finger 31 which at its lower end is connected to a conducting strip 33 supported on but insulated from the bottom of the casing 17 by means of insulating washers 34 and 35. The end of the contact strip 33 opposite to the finger 31 is connected by a binding nut 36 to one of the magnets 27 as by wire 149. These magnets are connected to each other by a wire 38 and one of the magnets has extending from it a wire 39 which extends down to a binding screw 40 in the base of the casing 17, which in turn forms part of a binding post 41 adapted to be connected to one of the line wires as will be later described.

Passing through the end wall of the casing 17 is a binding post 42 whose inner end is bifurcated to form a split head 43 within which is pivoted an arm 44 carrying a resilient contact finger 45 which projects radially outward beyond the armature 24 and is provided on its under face with a non-conducting strip 46. The end of this finger 45 is within the path of movement of the angular terminal end 23 of arm 22 so that as the arm 22 is depressed this angular terminal end will engage the finger 45 and force it downward. The finger will be returned to its normal position by means of a spring 47. The arm 44 is prevented from moving above the position shown in Figs. 7 and 8 by means of a stop 48, but the finger 45 will resiliently yield to permit the passage of the member 23 to a point above the finger, as illustrated in Fig. 7. The arm 22 is yieldingly held in its raised position by means of a spring detent 49 which is fastened to the upper wall of the casing 17, and which is downwardly curved approximately along the path of movement of the angular portion 23 and then outwardly curved.

When the arm 22 is forcibly moved down to the position shown in Fig. 8 by the lowering of the shutter so as to expose the print, it will readily move past the detent 49. When the arm is released it will move from the position shown in Fig. 8 to that shown in Fig. 7, thus releasing the shutter and the angular terminal end 23 of the arm will slip past the downwardly curved portion of the spring detent 49 until it takes the position shown in Fig. 7 wherein the arm is held in its raised position by means of said spring detent.

The switch mechanism which is disposed upon the front of the box, and whereby the clock mechanism is started, will be later described.

Time controlling means for energizing the magnets 27 to thereby release the shutter holding arm is illustrated in Figs. 3, 4 and 5, and details of it are illustrated in Figs. 10, 11 and 12. As illustrated in Fig. 1, this mechanism is inclosed within a case 50 mounted in any convenient position with relation to the printing frame. The case is preferably provided with a solid door 51 and rests upon a base 52 which forms the base upon which the clock mechanism is directly supported.

Supported in front of the clock mechanism is a circular dial 53, preferably of glass, and having time graduations thereon disposed concentrically to the center of the dial. As shown, the dial is divided into major divisions indicating minutes, and minor fractions thereof. A stud 54 passes through the center of the dial and mounted upon the stud to rotate therewith and disposed immediately behind the dial, is a metallic disk 55. Also mounted upon the stud in front of the disk but rotatable therewith is a pointer 56 co-acting with the time graduations. It will be understood that this pointer or index might be formed integral with the disk, it being merely essential that the pointer must move with the disk. The central stud is provided with a knurled head 57 whereby the head, pointer and disk may be turned. Mounted upon the inside plate of the dial 53 is a metallic bar 58 which forms the means for rotatably supporting the disk 55, and also forms means whereby current is conducted to the disk. The stud 54 projects into the lower end of this metallic bar, whereby to rotatably support the disk upon the bar. Projecting from the disk 55 and disposed immediately behind the pointer 56 is a cleft stud 59 carrying an angularly disposed contact pin 60 (see Fig. 11).

Mounted upon the base 52 are the usual supporting members or standards 61 and 61ª. Mounted in these standards or frames is a spring winding arbor 62 upon which is wound a motor spring 63, one end of which is attached by fixed pin 64 to a gear wheel 66. The usual ratchet pawl 65 is provided to hold the arbor as the spring is wound up.

Carried upon the arbor and actuated by the spring is the gear wheel 66 which meshes with a pinion 67 on a shaft 68 which shaft carries a gear wheel 69 which meshes with a pinion 70 on a shaft 71. On this shaft is mounted a gear wheel 72 in turn meshing with a pinion 73 on shaft 74 carrying gear wheel 75 which meshes with the pinion on the shaft 76. The end of this shaft carries an escapement wheel 77 with which engages the pallet 78 (see Fig. 12). Supported upon the pallet and movable therewith is a downwardly and laterally inclined bar 79, the pallet and bar being mutually pivoted upon a supporting member 80.

Meshing with gear wheel 69 is a gear wheel 81 which is mounted upon a main arbor 82. I do not wish to be limited to any particular train of gears whereby power may be transmitted from the spring to the main arbor or to the escapement. I have shown ordinary clock gearing for this purpose and the particular arrangement of the clock train is relatively of slight importance. The main arbor 82 projects through the front frame or standard 61 and carries on it a sleeve which in turn carries on it the friction disk 83 so that the friction disk turns with the main arbor.

Supported immediately in alinement with the center of the arbor 82 and in front of the friction disk is a short shaft 84 which is supported by depending hinged bar 85, the construction of which will be later described. This shaft carries upon it a pinion 86, the contact finger 87 and the radially extending resilient disk engaging fingers 88 which are intended to press frictionally against the disk so as to cause a rotation of the shaft 84 with the main arbor when the fingers are in contact with the disk. Rotatably mounted upon the supporting member 85 is a sector gear 89 whose teeth mesh with the pinion 86. The sector gear has at its pivotal extremity an angularly projecting finger 90 perforated for the passage of a rod 91. This rod is much smaller than the perforation and is adapted to slip up and down through the perforation of the finger.

Projecting from the pivot of the sector gear 89 is a stop 92 which extends into the path of movement of the long arm of finger 87, this finger having one arm longer than the other. This stop permits nearly a full revolution of shaft 84 which is sufficient for the pinion 86 to move the sector gear from a position with the arm 90 raised as in Fig. 10 to a position with the arm 90 drawn down.

The rod 91 has a stop 91ª at its lower end and passes loosely through the perforation in the finger 90 and at its upper end is connected to a forwardly projecting spring arm 93. The rod 91 is formed intermediate its ends with a coil 94. The arm 93 is mounted on a clip 94 pivoted to a supporting bracket 95. This clip has a downwardly projecting lug 96 which enters a perforation 97 formed in the rear end of the vertically disposed portion 99 of an armature supporting bar 98, the lower end of this bar being pivoted to the base 52 and the upper end supporting an armature 105.

The forward end of the portion 99 of the armature support is downwardly bent as at 100 and enters a yoke 101, the rear bar of which limits the outward movement of the armature support. The forward bar of the yoke is formed by a pintle 102 pivoted in the yoke, and to this pintle is attached the forward end of the bracket 95 and the angular upper end of the supporting member 85. Thus the supporting member is pivoted at its upper end for movement in a vertical plane extending from front to rear of the machine, and thus the lower end of the supporting member 85 can move toward or away from the friction disk 83.

Projecting at right angles on bar 98 is an arm 103 which carries a pin 104 passing through perforations in the standards or frames 61 and 61$^a$. This pin when armature 105 is attracted by magnet 106 acts to push out on the lower end of supporting member 85 and thus carry the depending end outward, disengaging the frictional fingers 88 from their frictional engagement with the friction disk 83.

All the mechanism heretofore described is for the purpose of returning the contact finger 87 to its original position after the shutter has been operated and before it is to be again operated. The operation of this part of the mechanism will be described later in conjunction with the rest of the apparatus.

Supported on the frame formed by the standards 61 and 61$^a$ by means of brackets 107 are a pair of starting magnets 108, and pivotally mounted below the cores of these magnets is an armature 109 (see Fig. 12). This armature is held away from the magnets by a spring 110 connected to a clapper arm 111, the other end of the spring being connected to a pin 112. Projecting outward from the armature is an arm 113 which is curved laterally around the standard 61 and then extends downward as at 114 and contacts with a stop pin 115.

Pivotally mounted upon a post 116 is a bell crank lever formed of a wire whose middle portion is coiled around the post to form a bearing. One arm 117 of this bell crank lever rests on the arm 113, the terminal end of this arm being angularly bent for this purpose, while the other arm 118 extends downward and constitutes a detent, it being provided with a notch 119 in that end. The arm 117 is drawn downward by means of a spring 117$^a$. This spring is bowed and its lower end is attached to a pin as will be later described. This detent is held by the spring 117$^a$ normally in engagement with a latch arm acted upon by a stopping magnet as will be now described. The stopping magnet is designated 120. This magnet or pair of magnets is supported adjacent to the base of the machine and hingedly or pivotally mounted above the poles of the electro-magnets 120 is the armature 121. This armature is normally held away from the poles of the magnets by a spring 122 drawing upward on an arm 122$^a$. To the free edge of the armature is connected a pull rod 123 which extends upward and is slotted at its upper end. Mounted upon a pintle 124 is a hook shaped finger 125 which passes through the slot at the upper end of the pull rod 123 and is thereby loosely connected to the armature. Projecting from one end of the pintle 124 is an arm 126 which extends radially outward and is then bent downward and toward the front of the machine, and is then bent angularly as at 127 so as to extend across and normally rest on the bar 79. It is then bent parallel to the bar as at 128 and has an angular terminal end 129 which engages with the notch 119. A spring 130 tends to rotate the pintle 124 in the direction of the arrow, Fig. 12, when the member 129 is released from its engagement with the notch 119. When the magnets 108 are energized the detent 118 will be drawn back and release the arm 126. As soon as this occurs the escapement lever or bar 79 will be released and the clock mechanism begins to operate. As soon as stop magnet 120 is actuated, however, the pintle 124 will be rotated to throw the latch into engagement with the detent 118.

For the purpose of sounding a signal at the time the mechanism is started, and also sounding a signal at the time the mechanism is stopped, so as to indicate to the operator that the clock mechanism is started or that it has stopped and the shutter dropped, I provide bells designated 131 and 132 which are superposed upon each other in spaced relation, and operatively mounted upon the brackets 107. These bells may be of any suitable construction. Operating in conjunction with the bells is a clapper 133 mounted upon the end of a clapper rod 111 before referred to. As soon as the armature 109 is drawn into engagement by the energizing of the magnets 108, the clapper 133 will be thrown against one or both of the bells 131, 132 and the signal will be given. Mounted upon the armature 121 is a clapper rod 134 which extends laterally outward and then extends upward and carries upon its end a hammer or clapper 135 which extends into the shell of the lowermost bell 132 so that when the armature 121 is energized by the magnet 120 the clapper will be thrown against the bell, thus giving the signal.

Referring again to Figs. 6, 7, 8 and 9, it will be seen that upon the face of the casing 17 and insulated therefrom is a switch arm 136 movable from a neutral position into a position where its free end will contact with either one of two studs 137 and 138. The stud 137 is provided with a spring contact strip 139 which contacts with the interior of the metallic box or casing 17 or in any other suitable manner electrically connects the stud 137 with the shaft 19 upon which the arm 22 is mounted. The other contact stud 138 is in electrical connection with a spring contact 140, which in turn bears against and has electrical connection with the pivot 45ª upon which the finger 45 is mounted. A binding post 142 is adapted to engage a wire or other conductor leading to a battery and this binding post is in electrical engagement with the pivot of the switch key 136.

Referring now to the electrical diagram shown in Fig. 13, it will be seen that the key 136 is connected by the conducting wire 143 to the battery 144 and that from the opposite pole of the battery passes a conductor 145 to a binding post 146 from which a wire passes to the clock stopping magnets 120. From the clock stopping magnets the circuit is continued through the metallic parts of the clock and frame to the finger 87.

Mounted upon the disk 55 is the stud 59 which is in electrical connection through the disk to the conducting member 58. This conducting member is connected by means of a wire 147 to a binding post 148 from which a wire leads to the magnets 27 in the casing 17. From thence an electrical connection 149 leads to the conducting strip 33 by which the current is led to the spring contact strip 31. From this strip the current passes when the arm 20 is lowered to the contact post 30 and so back by means of the contact member 139 to the stud 137.

The magnets 106 through whose action the finger 87 is thrown back to its initial position and the starting magnets 108 are connected in a branch circuit. From the binding post 146 runs a conductor 150 which extends to the magnets 106 and these magnets are connected to the magnets 108 by means of the conductor 151 and thence a conductor 152 leads to the binding post 153 and from there a conductor 154 leads to the binding post 155 which is electrically connected to the spring finger 45. From this binding post a conductor 156 leads to the contact stud 138.

It will be seen that when the switch arm 136 is turned into contact with the stud 138 a circuit will be completed from the battery through said switch arm through conductors 154 and 152 to the magnets 108 and 106 and through conductor 150 to the conductor 145 and thus back to the battery 144 and that thus when the switch arm 136 is turned into engagement with the stud 138 the clock starting magnets will be energized as well as the magnets 106 whereby the timing finger will be drawn back to its initial position. If, on the other hand, the switch key or arm 136 be turned into electrical engagement with stud 137 and the arm 22 be depressed by rotating the shaft 19 a circuit will be completed, as the arm 22 engages with the switch finger 45 from the battery, through the key 136, through the conductor 139 from the arm 22 to the spring finger, thence along the conductors 154 and 152 to the clock starting magnets 108 and the resetting magnets 106 and back through the conductors 150 and 145 to the battery. It will likewise be seen that as soon as the contact finger 87 engages with the stud 60 that a circuit will be completed from the battery through the clock stopping magnets, through the conductor 147 to the magnets 27 through the conductor 149 to the conducting strip 33, through the finger 31 to the member 30, and thence through the material of the box or casing 17 back to the stud 137, thence through the switch arm 136 and conductor 143 to the battery 144.

I have not deemed it necessary to illustrate the arrangement of the wiring within the casing which incloses the clock work as this arrangement will be perfectly obvious to any electrician from the diagram given in Fig. 13, and may be varied in many ways.

The operation of my invention is as follows: When it is desired to time the exposure of a photographic negative and print, the negative and the paper on which it is to be printed are placed in the printing frame. The disk 55 is then rotated by the head 57 so that the pointer will indicate upon the dial the proper period of exposure. This will carry around with the disk, the stud 59. The shutter will now be drawn down to uncover the opening of the printing frame. When the shutter is drawn down, the stud thereon will engage the arm 20 and rotate it to the position shown in Fig. 8. As the arm rotates to its position it will carry with it the arm 22 and the angular end 23 of this arm in moving downward will contact with the spring finger 45, thus momentarily completing a circuit through the clock starting magnets 108 and the contact finger replacing magnets 106. The energizing of the clock starting magnets will withdraw the detent 118 from its engagement with the member 128, thus releasing the escapement as previously described, and the clock actuated mechanism will immediately start.

At the same time that the starting magnets are energized the resetting magnets 106 will be energized and the contact finger 87 will be drawn back to its initial position (if it has not already been manually carried back to that position) by drawing upward upon the rod 91 and rotation of the sector gear 89. It is, of course, assumed that the key 136 is in the position shown in Fig. 13 and in contact with the contact member 137.

The clock actuated mechanism operates to rotate the main arbor and this in turn rotates the disk 83. This through its frictional engagement with the fingers 88 rotates the shaft 84 and this carries with it in a circular or a closed path the contact finger 87. The contact finger continues to move around until it comes in contact with the stud 59. When this occurs a circuit is immediately completed from the battery through the key 136, the connection 139, the contact strip 31, the contact bar 33, the conductor 149, through the magnets 217 to the stud 59, thence through the finger 87, thence to the clock stopping magnets 120 and back to the battery. As soon as the clock stopping magnets are actuated they will cause the projection of the latch 128 to move into engagement with detent 118. This will lock the escapement and stop the clock. At the same time the magnets 27 will be energized, thus drawing inward on the armature 24. This will release the detent 25 from its engagement with the terminal end 23 of the arm 22 and the shutter counterweights will cause the shutter to fly upward, thus turning the arm 20 to the position shown in Fig. 7, whereupon the slot in the arm will permit the stud on the shutter to move upward and entirely release the shutter. It will be seen that as soon as the arm 22 moves upward the circuit between the member 30 and the strip 31 is broken and the magnets 27 are deënergized allowing the springs 26 to throw the armature 24 to its original position. It will be noted that the arm 22 does not have electrical connection with the spring 45 upon the return of the arm 22 to its raised position, due to the fact that the inner face of the finger 45 is insulated as at 46.

It will be seen that the contact finger 87 remains at the position it had when the clock work was stopped, but this contact finger is returned to its initial position by the energizing of the replacing magnets 106 which actuate when the shutter is next depressed or this finger will be returned to its initial position by rotating the disk 55 in a direction to bring the pointer to the zero mark. This automatic finger replacing means could be dispensed with, but this would necessitate that after every exposure the pointer on the disk 57 should be returned to its original position so that the stud 59 would engage the finger 87 and return it to its original position on the stop 92.

By reference to Fig. 13, it will be seen that when the key 136 is in its neutral position the circuits through the several magnets will not be closed whether the shutter be drawn down or not. When it is desired to start the clock operating mechanism therefor the key 136 is turned from its neutral position into engagement with the stud 138, thus completing the circuit through the clock starting magnets. As soon as this is done the key is turned immediately to the stud 137 whereby an interrupted circuit is made through the battery or through the magnets 27 and the clock stopping magnets 120 which circuit will be completed when the finger 87 contacts with stud 59.

It will be seen that my apparatus works automatically to shift the shutter to an occulting position as soon as the negative has been exposed a predetermined length of time, and thus stop the printing of the negative. It will further be seen that with the key 136 turned to the position shown in Fig. 13 the clock mechanism will start automatically every time that the shutter is pulled down. It will furthermore be seen that the various parts of the mechanism may be arranged beforehand, the shutter lowered already to start and the starting be done by simply shifting the key 136 into contact first with the stud 138 and then with the stud 137. It will furthermore be seen that the time of exposure may be accurately adjusted by shifting the disk 55 so as to carry the stud 59 to any desired angular distance from the finger 87.

While I have used my apparatus with a dial providing for a maximum exposure of ten minutes, it will, of course, be obvious that the clock mechanism and the dial may be arranged to give a maximum exposure of a longer time if desired. My apparatus is calculated to give an exposure of any fraction of the maximum time for which the clock mechanism is arranged.

While I have described my shutter in detail, I wish it distinctly understood that I do not wish to limit myself to the precise form of shutter illustrated, but that it may be modified in many ways within the discretion of the user. The shutter could be made to cover the printing frame when it is down or up or could be shifted laterally instead of vertically if so desired. The clock and shutter release can be used in connection with any printing machine, now on the market which has the shutter raised or lowered by hand and released by hand or foot pedal. My device can also be used in connection with an enlarging camera and the shutter release can be mounted right above the enlarging lens in front of the camera and the shutter can be attached immediately to the arm 20. Indeed I do not wish to limit my invention to the use of a shutter as it is obvious that the shutter release mechanism might be used to open a switch and cut out the electric light, whereby the printing is accomplished.

Having described my invention, what I claim is:

1. The combination with a shutter urged to an occulting position, of a pivoted arm engageable with the shutter when in its non-occulting position to hold it in the last named position, a detent holding the arm in its last named position, electrically actuated means for releasing said detent, a motor, means impeding the movement of the motor, electrically actuated means operated upon a movement of said arm to its holding position for releasing said impending means, thereby permitting the movement of the motor, and circuit controlling means actuated by the operation of the motor for a predetermined time for energizing the electrically actuated means for releasing said detent.

2. In mechanism of the character described, a motor, a shaft driven thereby, a friction element mounted upon said shaft, a shaft mounted in alinement with the first named shaft having a friction element thereon coacting with the first named friction element when the two are in contact, a contact member movable with the second named shaft in a closed path, a contact member disposed in the path of the first named contact member and adjustable toward or from the initial position of the same, means for releasing the motor, means actuated by the contact of the two contact members for stopping the motor, and means actuated by a restarting of the motor for shifting the friction elements out of engagement with each other and returning the contact member to its initial position.

3. The combination with a movable shutter urged to an occulting position, of means for latching said shutter in a non-occulting position, electromagnetic means for releasing said latching means to permit the shutter to move to its occulting position, a time-keeping mechanism for controlling said electromagnetic means, locking means for said time-keeping mechanism, electromagnetic means actuated by the movement of said shutter to its occulting position for releasing said locking means, and electromagnetic means for causing said locking means to stop said time-keeping mechanism when said mechanism operates said shutter-releasing means.

4. The combination with a movable shutter urged to an occulting position, of means for holding said shutter in a non-occulting position, electromagnetic means for releasing said last mentioned means to permit the shutter to move to its occulting position, circuit-controlling means included in the electric circuit of said electromagnetic means, a motor for actuating said circuit-controlling means, means whereby the operation of said motor is normally prevented, and means cooperating with said last mentioned means for permitting the operation of said motor when the shutter is moved to its non-occulting position and for stopping said motor when the shutter is moved to its occulting position.

5. The combination with a movable shutter urged to an occulting position, of means for holding said shutter in a non-occulting position, means for releasing said last mentioned means to permit the shutter to move to its occulting position, a time-keeping mechanism for controlling said shutter-releasing means, means for preventing the operation of said time-keeping mechanism, and means cooperating with said last mentioned means for permitting said time-keeping mechanism to operate when said shutter is moved to a non-occulting position and for stopping said time-keeping mechanism when said shutter is moved to an occulting position.

6. The combination with a movable shutter urged to an occulting position, of means for holding said shutter in a non-occulting position, electromagnetic means for releasing said last mentioned means to permit the shutter to move to its occulting position, circuit-controlling means included in the electric circuit of said electromagnetic means, a time-keeping mechanism for actuating said circuit-controlling means, means for maintaining said time-keeping mechanism inactive, electromagnetic means actuated by the movement of said shutter to its non-occulting position for releasing said last mentioned means to permit the time-keeping mechanism to operate, and additional electromagnetic means for resetting the above "last mentioned means" to stop the time-keeping mechanism when the shutter is moved to an occulting position.

In testimony whereof I affix my signature in presence of two witnesses.

CHARLES HUTTER. [L. S.]

Witnesses:
JOSEPH P. BUYNISKI,
JOSEPH MORKAITY.